United States Patent
Szonok (10) Patent No.: US 9,828,779 B2
(45) Date of Patent: Nov. 28, 2017

(54) FOOT MOUNTED WORK ACCESSORY AND METHOD OF USE

(71) Applicant: Tamas Szonok, Warrenton, VA (US)

(72) Inventor: Tamas Szonok, Warrenton, VA (US)

( * ) Notice: Subject to any disclaimer, the term of this patent is extended or adjusted under 35 U.S.C. 154(b) by 0 days.

(21) Appl. No.: 15/263,898

(22) Filed: Sep. 13, 2016

(65) Prior Publication Data
US 2017/0073980 A1    Mar. 16, 2017

Related U.S. Application Data
(60) Provisional application No. 62/218,725, filed on Sep. 15, 2015.

(51) Int. Cl.
| | | |
|---|---|---|
| E04B 1/00 | (2006.01) | |
| E04F 21/00 | (2006.01) | |
| H02G 1/06 | (2006.01) | |
| F24D 13/02 | (2006.01) | |

(52) U.S. Cl.
CPC .............. *E04F 21/00* (2013.01); *H02G 1/06* (2013.01); *F24D 13/02* (2013.01)

(58) Field of Classification Search
CPC .. E04F 21/00; E04F 21/22; A43B 3/00; A43C 15/063; H02G 1/06
USPC .............................. 36/85, 106, 122; 52/749.1
See application file for complete search history.

(56) References Cited

U.S. PATENT DOCUMENTS

| | | | |
|---|---|---|---|
| 1,079,941 A | 12/1913 | Henschel | |
| 2,985,970 A * | 5/1961 | McCarthy | A43B 13/00 12/142 R |
| D297,702 S | 9/1988 | Persson | |
| 5,232,187 A * | 8/1993 | O'Farrell | B44D 3/14 248/148 |
| 6,446,300 B1* | 9/2002 | Sleezer | A47L 13/282 15/227 |
| 6,698,979 B1 | 3/2004 | Ambrose | |
| 6,915,549 B2 | 7/2005 | Forsberg et al. | |
| 6,981,294 B2 | 1/2006 | Edwards | |
| 8,695,943 B2 | 4/2014 | Morand et al. | |
| 8,984,703 B1 | 3/2015 | Hull | |
| 2002/0083623 A1* | 7/2002 | Joseph | A43B 3/00 36/122 |
| 2005/0166943 A1* | 8/2005 | Owens | A47L 13/282 134/6 |
| 2014/0096416 A1* | 4/2014 | Steigerwald | A43B 3/001 36/124 |

* cited by examiner

*Primary Examiner* — Brian D Mattei
(74) *Attorney, Agent, or Firm* — Welsh Flaxman & Gitler LLC (57) ABSTRACT

A foot mounted work accessory used in the installation of a flooring underlayer and associated electrical heating wire includes a substantially rigid base member including an upper surface and a lower surface with sidewalls extending between the upper surface and the lower surface. The base member further includes a first end having a forward edge extending between the upper and lower surfaces and a second end having a rear edge extending between the upper and lower surfaces, first and second lateral edges extend between the upper surface and the lower surface along the left and right sides of the base member. An alignment channel is formed at a forward tip of the foot mounted work accessory. A foot strap is secured to the upper surface of the base member.

12 Claims, 6 Drawing Sheets

FOOT MOUNTED WORK ACCESSORY AND METHOD OF USE

CROSS REFERENCE TO RELATED APPLICATION

This application claims the benefit of U.S. Provisional Patent Application Ser. 62/218,725, entitled "FOOT MOUNTED WORK ACCESSORY AND METHOD OF USE," filed Sep. 15, 2015.

BACKGROUND OF THE INVENTION

1. Field of the Invention

The invention relates to a foot mounted work accessory. More particularly, the invention relates to a foot mounted work accessory for utilization in the installation of a flooring underlayer. The invention also relates to a method for the installation of a flooring underlayer, and associated accessories, utilizing the foot mounted work accessory.

2. Description of the Related Art

In-floor heating systems are well known. These systems utilize heat conduction and radiant heat emanating directly from the flooring structure. The use of electrical floor heating systems offers various advantages over fluid based systems. The electrical floor heating systems have low installation costs and are well suited for a variety of rooms.

One common system for electrical floor heating systems is the PRODESO® underfloor heat system by Progress Profiles SPA. The system provides a flooring underlayer with a plurality of bosses emanating therefrom. The bosses are spaced in such a way to allow an installer to firmly secure a heating element therebetween. As such, heating wire is secured to the underlayer in a serpentine manner providing for a well-organized wire arrangement leading to the provision of consistent heat along the completed flooring surface when the heating system is fully installed.

However, and as those skilled in the art will appreciate, the installation of the wire within the flooring underlayer is back-breaking work require a great deal of time and effort. As such, a need exists for an apparatus and method allowing for the convenient installation of heating wire in electrical floor heating systems, and similar systems requiring precise positioning of wire along a substrate.

SUMMARY OF THE INVENTION

It is, therefore, an object of the present invention to provide a foot mounted work accessory used in the installation of a flooring underlayer and associated electrical heating wire. The foot mounted work accessory includes a substantially rigid base member including an upper surface and a lower surface with sidewalls extending between the upper surface and the lower surface. The base member further includes a first end having a forward edge extending between the upper and lower surfaces and a second end having a rear edge extending between the upper and lower surfaces, first and second lateral edges extend between the upper surface and the lower surface along the left and right sides of the base member. An alignment channel is formed at a forward tip of the foot mounted work. A foot strap is secured to the upper surface of the base member.

It is also an object of the present invention to provide a foot mounted work accessory wherein the forward edge is constructed with first and second arcuate segments that meet at a central longitudinal axis of the foot mounted work accessory.

It is another object of the present invention to provide a foot mounted work accessory wherein the foot mounted work accessory is formed in a substantially teardrop shape.

It is a further object of the present invention to provide a foot mounted work accessory including an alignment channel member at the first end of the base member, the alignment channel member being pivotally secured the base member at the first end of the foot mounted work accessory for pivoting about an arc.

It is also an object of the present invention to provide a foot mounted work accessory wherein the alignment channel member includes a first semicircular end shaped and dimensioned to fit within a similar semicircular recess formed at the first end of the base member.

It is another object of the present invention to provide a foot mounted work accessory wherein the alignment channel member also includes a second end with a forward tip having the alignment channel formed therein.

It is a further object of the present invention to provide a foot mounted work accessory wherein the alignment channel is a recessed groove.

It is also an object of the present invention to provide a foot mounted work accessory wherein the alignment channel includes a curved configuration that changes in its relative angular orientation in a manner adapted to prevent wire breakage and enhance application of the electric heating wire within the flooring underlayer.

It is another object of the present invention to provide a foot mounted work accessory wherein the alignment channel includes an upper channel segment formed at an 80°-100° angle relative to the upper surface of the base member.

It is a further object of the present invention to provide a foot mounted work accessory wherein the alignment channel also includes a lower channel segment having an angle of 100°-120° relative to the upper channel segment.

It is also an object of the present invention to provide a foot mounted work accessory wherein the alignment channel is provided with a curved transition between the lower channel segment and the upper channel segment so as to enhance the passage of the electrical heating wire therethrough.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

Referring to FIGS. 1-7, a foot mounted work accessory 10L, 10R is disclosed. The foot mounted work accessory 10L, 10R is used in the installation of a flooring underlayer 100 (for example, a PRODESO® underfloor heat system by Progress Profiles SPA). In use, a foot mounted work accessory 10L, 10R is strapped to at least one of the installer's feet and the installer moves across a flooring underlayer 100 in a manner properly and efficiently to secure the flooring underlayer 100 to a base surface. It is well appreciated that the present work accessory commonly works best when mounted to both of the installer's feet as he or she moves across the underlayer, but it should similarly be appreciated a single work accessory may be used where necessary.

The foot mounted work accessory 10L, 10R is further utilized in the installation of electrical heating wire 102 commonly used in conjunction with heat generating flooring underlayers 100. In particular, and as will be explained in greater detail below, the foot mounted work accessory 10L, 10R is structured to guide the electric heating wire 102 to desired positions along the flooring underlayer 100 so as to force the electric heating wire 102 into its selected positions along the flooring underlayer 100.

Through the provision of the present foot mounted work accessory 10L, 10R, the installation process for a flooring underlayer 100 is improved, while the wear and tear on the body of the installer is greatly reduced because it is no longer necessary for the installer to get on his/her hands and knees to ensure the flooring underlayer 100 is fully secured to the support surface 104 and the electric heating wire is properly positioned along the flooring underlayer 100. Rather, the foot mounted work accessory 10L, 10R of the present invention allows an installer to remain fully uptight while applying his/her full weight to the flooring underlayer 100 during the installation process.

With regard to the structure of the foot mounted work accessory 10L, 10R it should first be appreciated that the foot mounted work accessory 10L, 10R is most commonly used when a foot mounted work accessory 10L, 10R is secured to at least one of the installer's feet. As such, the foot mounted work accessory 10L, 10R respectively comes in a left foot version and a right foot version, wherein the left foot version and the right foot version are mirror images of each other in much the same manner as a left foot shoe and a right foot shoe. Given the symmetry of the embodiment disclosed herein, it is appreciated it may not be necessary provide both a left and right foot mounted work accessory. With this in mind, the left foot mounted work accessory 10L is described in detail below. Considering that the left and right foot versions are contemplated in accordance with the present invention, the same reference numerals are used in conjunction with both the left and right foot versions as they are identical mirror images of each other.

Figure 1:
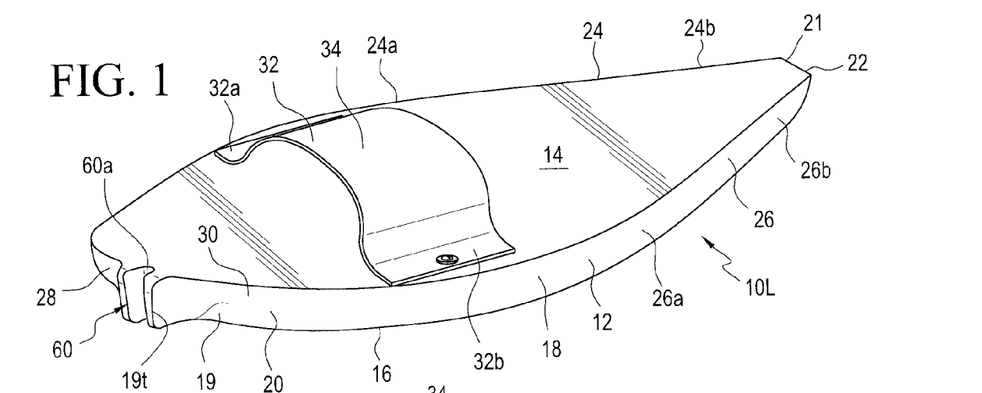
FIG. 1 is a top perspective view of a foot mounted work accessory in accordance with the present invention.
Figure 2:
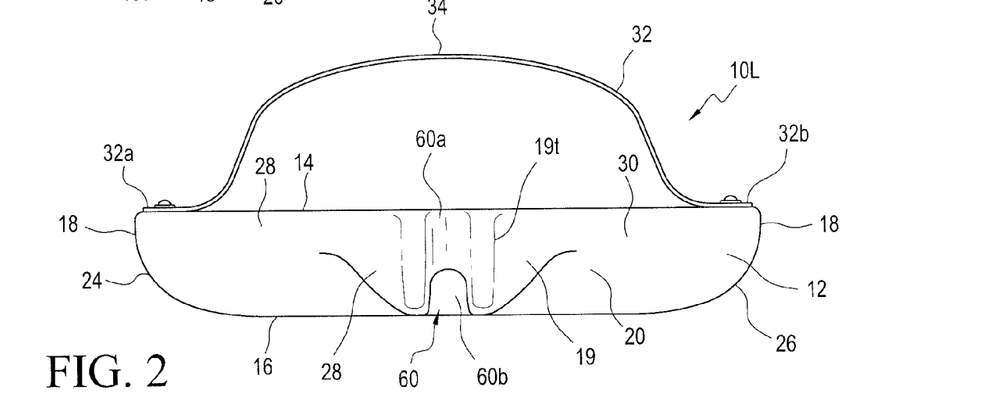
FIG. 2 is a front view of the foot mounted work accessory shown in FIG. 1.
Figure 3:
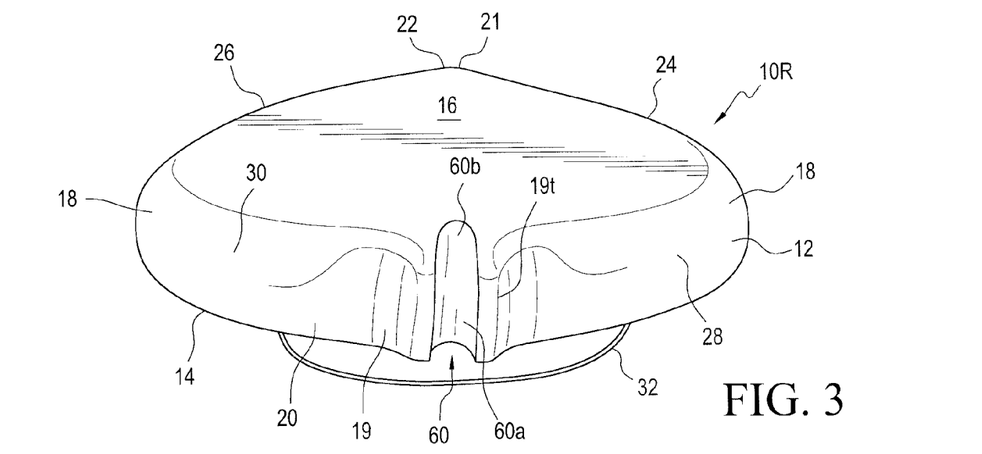
FIG. 3 is a bottom perspective view of the foot mounted work accessory shown in FIG. 1.
Figure 4:
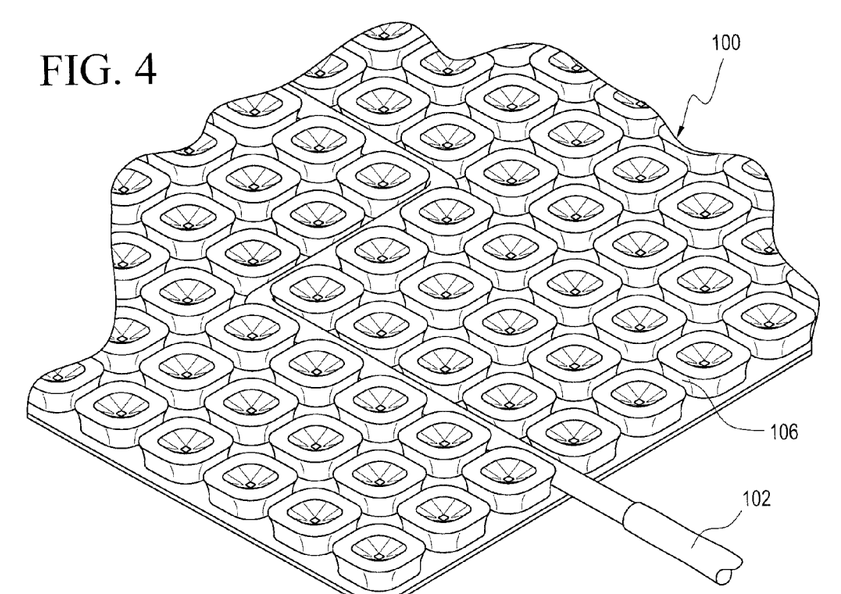
FIGS. 4 and 5 are perspective views showing various steps in the use of the foot mounted work accessory of the present invention in the installation of a flooring underlayer.
Figure 5:
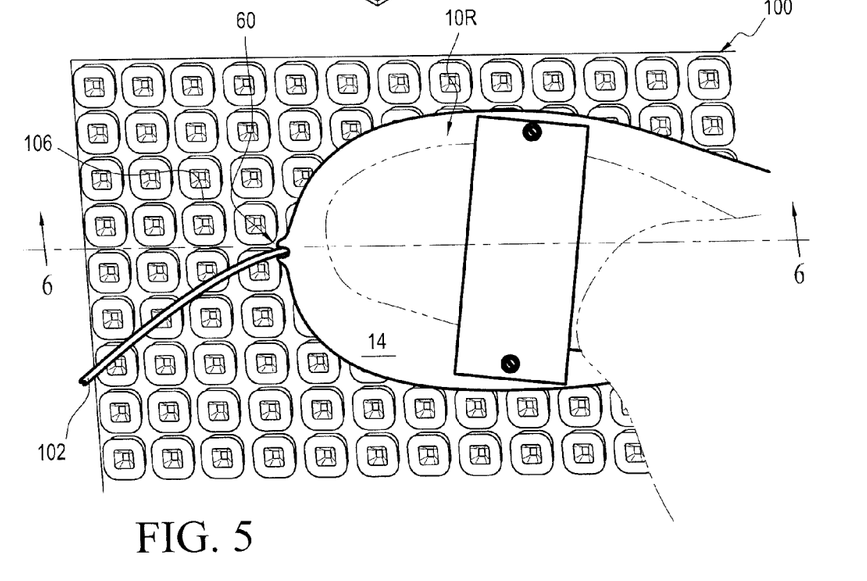
Figures 6, 7:
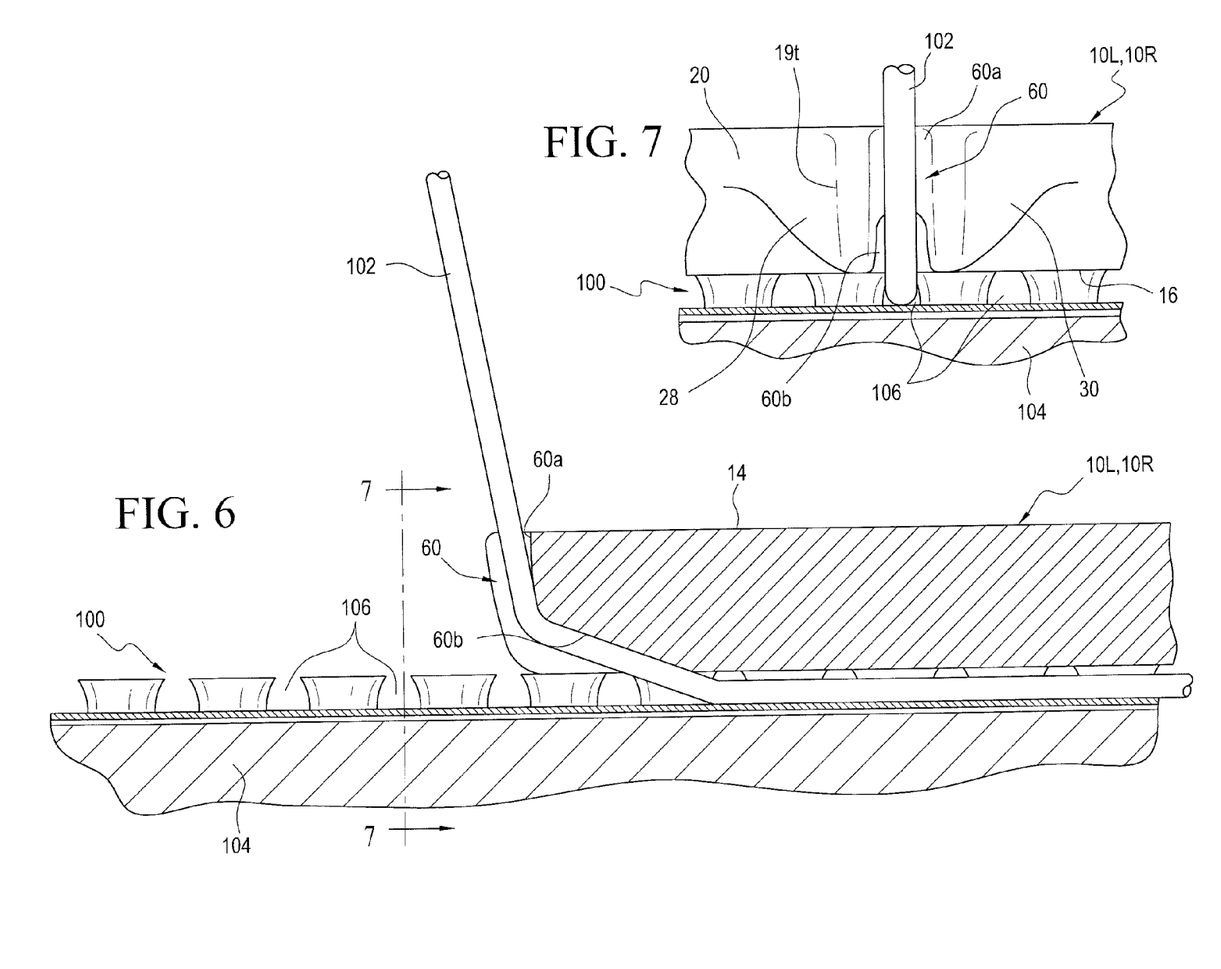
FIG. 6 is a cross sectional view along the line 6-6 of the installation process as shown in FIG. 5.
FIG. 7 is front view of the installation process shown in FIG. 5.

Referring to FIGS. 1 to 3, a preferred embodiment of a foot mounted work accessory 10L includes a horizontal substantially rigid base member 12. It should be appreciated that since the base member 12 is the predominant element of the foot mounted work accessory 10L disclosed with reference to the embodiment of FIGS. 1-7, references to the upper surface, lower surface, sidewalls, first end, second end etc. of the base member 12 also apply equally to the foot mounted work accessory 10L, for example, the upper surface of the base member 12 is also the upper surface of the foot mounted work accessory 10L. The base member 12 includes an upper surface 14 and a lower surface 16 with sidewalls 18 extending between the upper surface 14 and the lower surface 16. More particularly, the foot mounted work accessory 10L is formed in a substantially teardrop shaped configuration and the base member 12 has a first end 19 having a forward edge 20 extending between the upper and lower surfaces 14, 16, and a second end 21 having a rear edge 22 extending between the upper and lower surfaces 14, 16 along the rear of the base member 12. First and second lateral edges 24, 26 extend between the upper surface 14 and the lower surface 16 along the left and right sides of the base member 12. As is appreciated given the teardrop shape of the base member 12, it is symmetrically configured when one considers the left (when viewed as shown in FIGS. 1 and 2) first lateral edge 24 and the right (when viewed as shown in FIGS. 1 and 2) second lateral edge 26 thereof. With this in mind, the forward edge 20 transitions into the first and second lateral edges 24, 26 along a curved configuration. For the sake of providing a written description of the foot mounted work accessory 10L, it may be considered that the forward edge 20 is constructed with first and second arcuate segments 28, 30 that meet at the central longitudinal axis of the foot mounted work accessory 10L. The first and second arcuate segments 28, 30 extend from the forward tip 19t at the first end 19 of the base member 12 of the foot mounted work accessory 10L to the first and second lateral edges 24, 26 of the base member 12 of the foot mounted work accessory 10L at a position where the width of the foot mounted work accessory 10L is its largest. Extending from the rearward ends of the first and second arcuate segments 28, 30 are the first and second lateral edges 24, 26 which extend from the forward edge 20 of the base member 12 of the foot mounted work accessory 10L to the rear edge 22 of the base member 12 of the foot mounted work accessory 10L (where a corner is formed that allows for positioning within flooring corners when the work mounted work accessory 10L is used in tight areas, for example, in flooring corners). The first and second lateral edges 24, 26 include a slightly arcuate portion 24a, 26a adjacent the first and second arcuate segments 28, 30 which transitions into a substantially straight section 24b, 26b as the first and second lateral edges 24, 26 extend from the forward edge 20 to the rear edge 22. The rear edge 22 is composed of a substantially straight member that connects the first and second lateral edges 24, 26 along the rear of the base member 12.

As will be explained below in greater detail, and with reference to FIGS. 1, 2, 3, 5, 6, and 7, the foot mounted work accessory 10L, 10R is provided with an alignment channel 60 in the form of a recessed groove at the forward tip 19t of the base member 12, that is, where the first and second arcuate segments 28, 30 of the forward edge 20 meet. The alignment channel 60 includes a curved configuration that changes in its relative angular orientation in a manner adapted to prevent wire breakage and enhance the application of the electric heating wire 102 within the flooring underlayer 100. In particular, the alignment channel 60 includes an upper channel segment 60a adjacent the upper surface 14 of the foot mounted work accessory. The upper channel segment is formed at an 80°-100° angle, and preferably a 90° angle, relative to the upper surface 14 of the base member 12 of the foot mounted work accessory 10L, 10R as it extends from the upper surface 14 toward the lower surface along the sidewall 18. The upper channel segment 60a transitions into a lower channel segment 60b as it approaches the lower surface 16 of the base member 12 of the foot mounted work accessory 10L, 10R; that is, the lower channel segment 60b is formed adjacent the lower surface 16 of the base member 12 of the foot mounted work accessory 10L. The lower channel segment 60b has an angle of approximately 100°-120°, and preferably 110°, relative to the upper channel segment 60a as it approaches the lower surface 16 of the base member 12 of the foot mounted work accessory 10L, 10R. The channel 60 is provided with a curved transition 60c between the lower channel segment 60b and the upper channel segment 60a so as to enhance the passage of the electrical heating wire 102 therethrough. This allows for the smooth passage of wire therethrough as it is applied to the flooring underlayer 100 in the manner described below in greater detail.

In accordance with an alternate embodiment and as shown with reference to FIG. 9-12, the alignment channel 660 of the foot mounted work accessory 610 is constructed to allow for selective reorientation in either a leftwardly oriented direction, rightwardly oriented direction or straight orientation aligned with the longitudinal axis of the foot mounted work accessory 610. Other than the modification disclosed below regarding the inclusion of an alignment channel member 659, the structure of the foot mounted work accessory 610 is the same as disclosed above with reference to FIGS. 1-7.

In particular, the forward edge 620 of the foot mounted work accessory 610 is provided with an alignment channel member 659 that is pivotally secured at the first end 619 of the base member 612 of the foot mounted work accessory 610 for pivoting about an arc of 180 degrees. While a range of motion of 180 degrees is disclosed in accordance with a preferred embodiment, the range of motion may ultimately be varied without departing from the spirit of the present invention.

The alignment channel member 659 includes a semicircular first end 661 that is shaped and dimensioned to fit within a similar semi-circular recess 663 formed at the first end 619 of the base member 612 of the foot mounted work accessory 610. The alignment channel member 659 also includes a second end 667 having straight edges 667a, 667b that lead to the forward tip 669 of the alignment channel member 659. The straight edges 667a, 667b of the second end 667 are oriented at approximately a 90 degree angle relative to each other and meet at an alignment channel 660 formed at the tip 669 of the alignment channel member 659. Given the flexibility of the alignment channel member 659 this embodiment is well suited for either the left or right foot.

The alignment channel member 659 is pivotally secured to the base member 612 of the foot mounted work accessory 610 with the alignment channel 660 extending forward. As such, and as shown with reference to FIGS. 10, 11 and 12, the alignment channel member 659 may be rotated left when it is desired to orient the alignment channel 660 to the left side of the foot mounted work accessory 610 or rotated right (not shown) when it is desired to orient the alignment channel 660 to the right side of the foot mounted work accessory 610.

In accordance with a preferred embodiment, an elongated support member 671 pivotally secures the alignment channel member 659 to the base member 612 of the food mounted work accessory 610. The elongated support member 671 extends from the base member 612 of the foot mounted work accessory 610, wherein the elongated support member 671 is secured to the base member 612, to a central pivot point 673 where the elongated support member 671 is pivotally secured to the alignment channel member 659.

As with the prior embodiment, the alignment channel 660 includes an upper channel segment 660a adjacent an upper surface 659a of the alignment channel member 659 (and the foot mounted work accessory 610). The upper channel segment 660a is formed at an 80°-100° angle, and preferably a 90° angle, relative to the upper surface 659a of the alignment channel member 659 and the foot mounted work accessory 610 as it extends from the upper surface 659a toward a lower surface 659b along a sidewall 659c of the alignment channel member 659. The upper channel segment 660a transitions into a lower channel segment 660b as it approaches the lower surfaces 659b of the alignment channel member 659 (and the foot mounted work accessory 610); that is, the lower channel segment 660b is formed adjacent the lower surfaces 659b of the alignment channel member 659. As with the prior embodiment, the lower channel segment 659b has an angle of approximately 100°-120°, and preferably 110°, relative to the upper channel segment 660a as it approaches the lower surface 659b. The alignment channel 660 is provided with a curved transition between the lower channel segment 660b and the upper channel segment 660a so as to enhance the passage of electrical heating wiring therethrough. As with the prior embodiment, this allows for the smooth passage of wire therethrough as it is applied to the flooring underlayer in the manner described below in greater detail.

With reference to the embodiment disclosed with reference to FIGS. 1-7, and considering other alternate embodiments will include similar structure, a foot strap 32 is secured to the upper surface 14 of the base member 12. In particular, an elongated strap 32 is stretched from a position adjacent the first lateral edge 24 of the base member 12 to a position adjacent the second lateral edge 26 of the base member 12. The strap 32 is secured at locations adjacent the first and second lateral edges 24, 26 such that a first end 32a of the strap 32 is secured to the upper surface 14 of the base member 12 adjacent the first lateral edge 24 and the second end 32b of the strap 32 is secured to the upper surface 14 of the base member 12 adjacent the second lateral edge 26, wherein the central portion 34 of the strap 32 is unsecured and is shaped and dimensioned so as to allow an individual to slip his/her foot thereunder in a manner retaining the user's foot to the upper surface 14 of the base member 12.

In accordance with a preferred embodiment, the base member 12 is constructed of a wood-based material. Further, the strap 32 is preferably constructed of leather or flexible plastic.

Figure 8A:
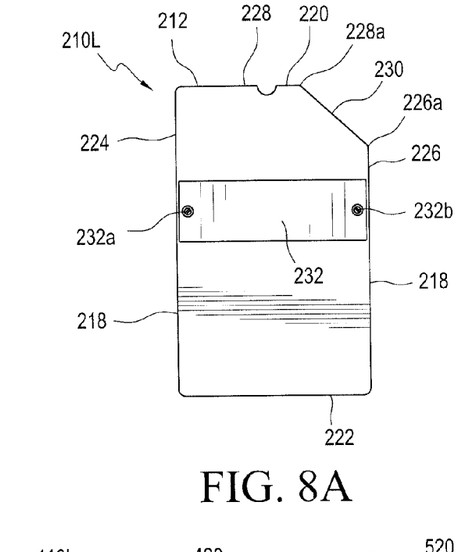
FIGS. 8A, 8B, 8C and 8D show various alternate embodiments of a foot mounted accessory in accordance with the present invention.

Referring to FIG. 8A, an alternate shape for the foot mounted work accessory 210L is shown (wherein the foot mounted work accessory for the right foot is a mirror image, although not shown herein). The foot mounted work accessory 210L includes a horizontal, substantially rigid base member 212. The base member 212 includes an upper surface 214 and a lower surface (not shown) with sidewalls 218 extending between the upper surface 214 and the lower surface. More particularly, a forward edge 220 extends between the upper and lower surfaces 214 along the front of the base member 212, a rear edge 222 extends between the upper surface 214 and the lower surface along the rear of the base member 212, and first and second lateral edges 224, 226 extend between the upper surface 214 and lower surface along the left and right sides of the base member 212.

The upper surface 214 and lower surfaces of the base member 212 are substantially flat surfaces and are substantially parallel to each other. This provides for an upper surface 214 shaped and dimensioned to support an installer's foot and a lower surface shaped and dimensioned to apply force in an evenly distributed manner to the flooring underlayer 100 being applied.

The effectiveness of the foot mounted work accessory 210L is improved by providing an angled surface along the forward portion thereof. As such, the forward edge 220 of the base member 212 is provided with a parallel section 228 and an angled section 230. The parallel section 228 lies in a plane that is substantially parallel to the plane in which the rear edge 222 lies, and the parallel section 228 has a longitudinal axis that is substantially parallel to the longitudinal axis of the rear edge 222. The angled section 230 of the forward edge 220 is, however, obliquely oriented relative to the parallel section 228. In particular, the angled section 230 is formed at an angle of approximately 45°.

As to the first lateral edge 224 and the second lateral edge 226, the first lateral edge 224 lies in a plane that is substantially parallel to the plane in which the second lateral edge 226 lies, and first lateral edge 224 has a longitudinal axis that is substantially parallel to the longitudinal axis of the second lateral edge 226. Further, the first lateral edge 224 and the second lateral edge 226 lie in a plane that is substantially perpendicular to the planes in which the rear edge 222 and the parallel section 228 of the forward edge 220 lie, and first lateral edge 224 and the second lateral edge 226 have longitudinal axes that are substantially parallel to the longitudinal axes of the rear edge 222 and the parallel section 228 of the forward edge 220 lie. The angled section 230 of the forward edge 220 is, however, obliquely oriented relative to the parallel section 228, as well as the other edge portions of the base member 212.

The angled section 230 extends between the parallel section 228 of the forward edge 220 and the second lateral edge 226, and as such is formed along the inside (that is the arch side) of an installer's foot when the installer's foot is properly mounted to the foot mounted work accessory 210L. In particular, and with regard to the foot mounted work accessory 210L adapted for attachment to the user's left foot, the angled section is formed between a first end 228a of the parallel section 228 of the forward edge 220 and a first end 226a of second lateral edge 226. As such, the second lateral edge 226, which extends between the angled section 230 of the forward edge 220 and the rear edge 222, is shorter in length than the first lateral edge 224, which extends between the parallel section 228 of the forward edge 220 and the rear edge 222.

A foot strap 232 is secured to the upper surface 214 of the base member 212. In particular, an elongated strap 232 is stretched from a position adjacent the first lateral edge 224 of the base member 212 to a position adjacent the second lateral edge 226 of the base member 212. The strap 232 is secured at locations adjacent the first and second lateral edges 224, 226 such that a first end 232a of the strap 232 is secured to the upper surface 214 of the base member 212 adjacent the first lateral edge 224 and the second end 232b of the strap 232 is secured to the upper surface 214 of the base member 212 adjacent the second lateral edge 226, wherein the central portion 234 of the strap 232 is unsecured and is shaped and dimensioned so as to allow an individual to slip his foot thereunder in a manner retaining the user's foot to the upper surface 214 of the base member 212.

Figure 8B:
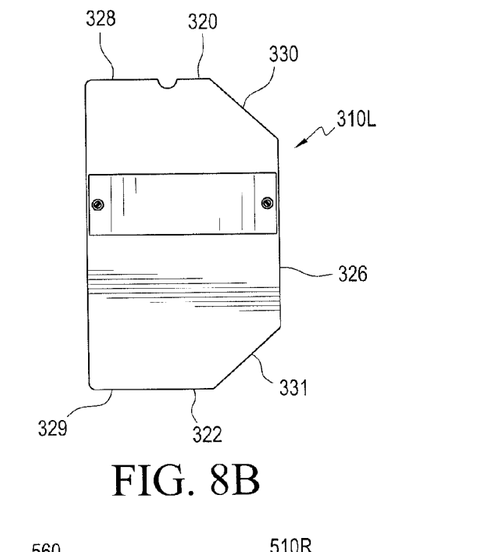

While various shapes are disclosed above, it is further appreciated the foot mounted work accessory may be constructed in various other shapes while remaining within the spirit of the present invention. For example, and with reference to FIG. 8B, the base member of the foot mounted work accessory 310L (wherein the foot mounted work accessory for the right foot is a mirror image, although not shown herein) includes an additional angled section 331 along the rear edge 322. Such an angled section 331 results in a rear edge 322 composed of a parallel section 329 and an angled section 331 which is a mirror image of the parallel and angled section 328, 330 formed along the forward edge 320. As such, and further to the angled section 330 along the forward edge 320, the parallel section 329 of the rear edge 322 lies in a plane that is substantially parallel to the plane in which the parallel section 328 of the front edge 320 lies and the parallel section 329 of the rear edge 322 has a longitudinal axis that is substantially parallel to the longitudinal axis of the parallel section 328 of the front edge 320. The angled section 331 of the rear edge 322 is, however, obliquely oriented relative to the parallel section 329 and extends from the parallel section 329 to the second lateral edge 326.

Figures 8C, 8D:
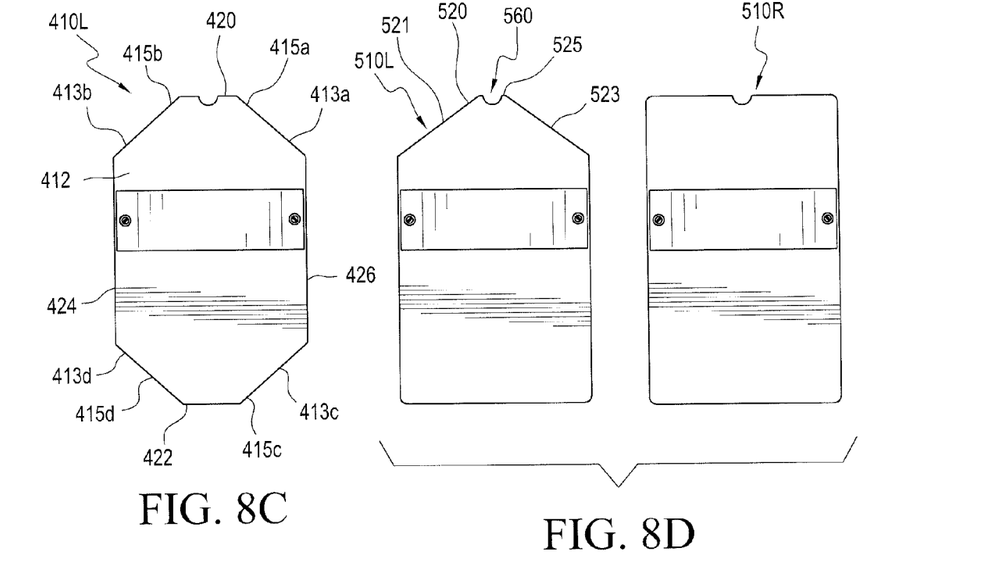
Figure 9:
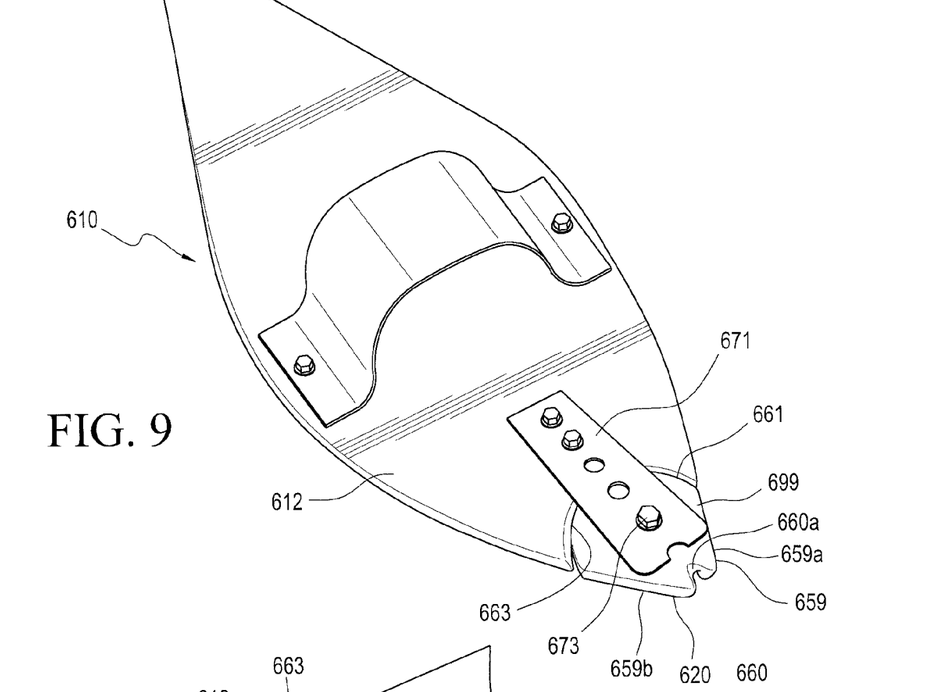
FIG. 9 is a top perspective view of a foot mounted accessory in accordance with an alternate embodiment.
Figure 10:
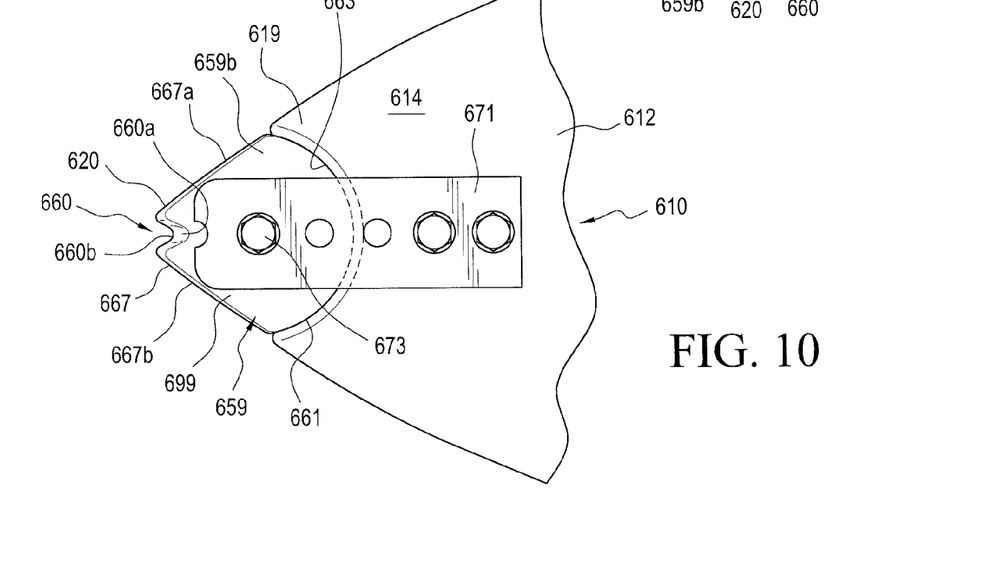
FIG. 10 is a detailed view of the first end of the foot mounted accessory shown in FIG. 9.
Figure 11:
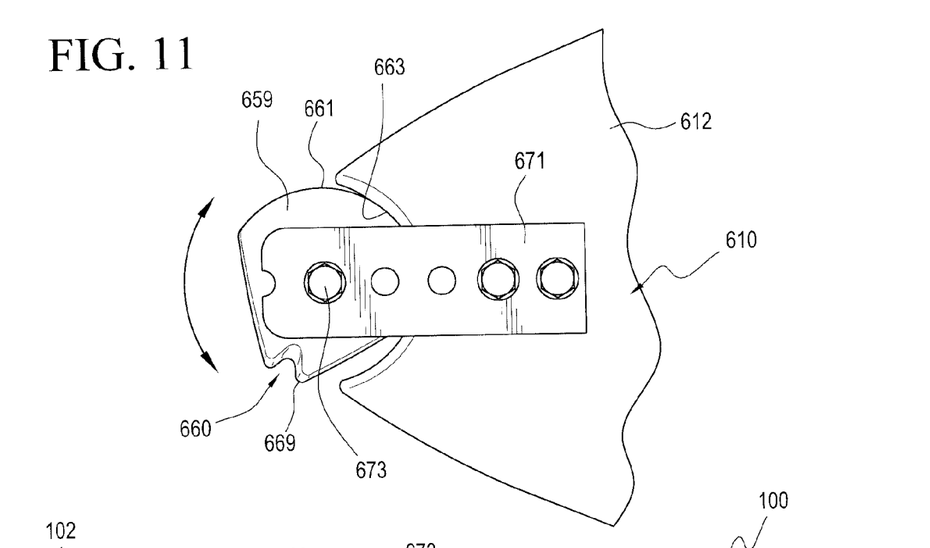
FIG. 11 is a detailed view of the first end of the foot mounted accessory shown in FIG. 9 showing movement of the alignment channel member.

Further, and with reference to FIG. 8C, all of the corners 413a-d of the base member 412 of the foot mounted work accessory 410L (wherein the foot mounted work accessory for the right foot is a mirror image, although not shown herein) are provided with angled sections 415a-d. Such a construction results in a forward edge 420, a rear edge 422, first and second lateral side edges 424, 426, and angled sections 415a-d respectively connecting all of the edges. Such a construction results in an eight-sided foot mounted work accessory 410L.

With regard to FIG. 8D, the left and right foot mounted work accessories 510L, 510R are of different shapes wherein the right foot mounted work accessory 510R is of a substantially square shape while the left foot mounted work accessory 510L has a forward edge 520 with a forwardly pointed configuration. As such, the forward edge 520 is composed of a first angular section 521 and a second angular section 523 which meet at a tip structure 525 having an alignment channel 560 formed therein that is useful in the alignment of wire as discussed below in greater detail.

In use, and with reference to the foot mounted work accessory embodiment disclosed with reference to FIGS. 4, 5, 6 and 7, adhesive is first applied to the upper surface of the support layer 104 and the flooring underlayer 100 is positioned on top of the support layer 104. A foot mounted work accessory 10R (the right is shown although the dexterity of the installer will dictate whether he/she uses the left or right foot) is first applied to at least one of the installer's feet with the upper surface 14 secured to the sole of the installer's work shoe(s). Once the foot mounted work accessory 10R is secured to either the left foot or the right foot, or both, the user may slide along the flooring underlayer 100 with the foot mounted work accessory 10R secured to at least one foot in a manner applying pressure thereto in a distributed manner so as to evenly and securely press the flooring underlayer 100 to support surface 104. In this way the installer is able to apply his/her full weight to the flooring underlayer 100 without necessitating the user get on his/her hands and knees to press the flooring underlayer 100 downward.

Figure 12:
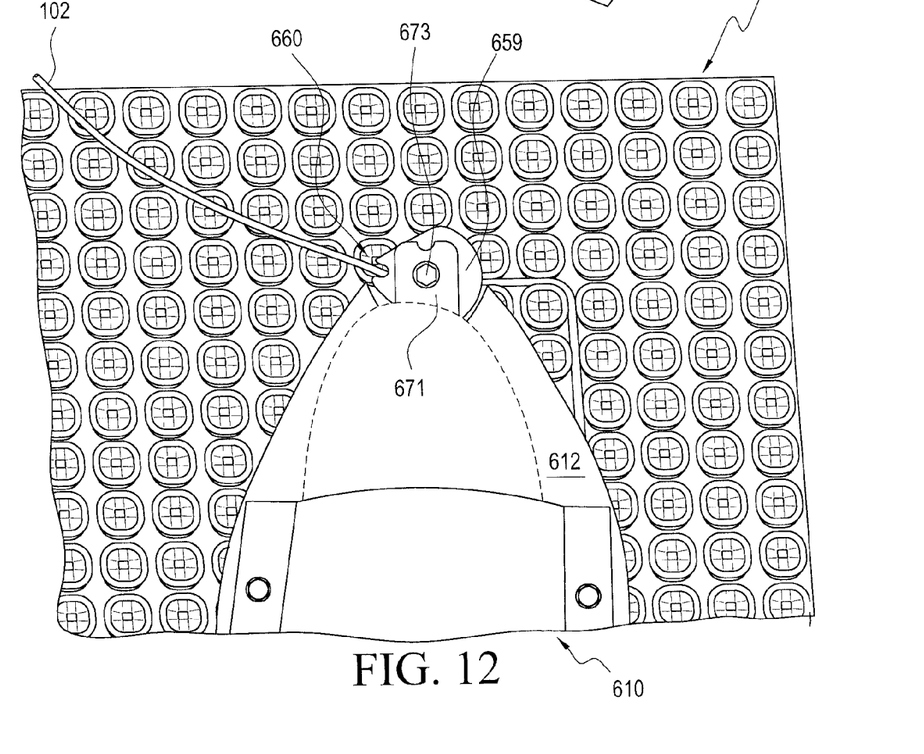
FIG. 12 is a detailed view of the first end of the foot mounted accessory shown in FIG. 9 showing use of the foot mounted work accessory in the installation of a flooring underlayer.

As discussed above, it is often desirable to apply electrical heating wire 102 within grooves formed in the flooring underlayer 100. With this in mind, and with reference to FIGS. 4-7 (as well as FIG. 12 showing an alternate embodiment of the foot mounted work accessory 610), once the flooring underlayer 100 is secured to the support surface 104, the electrical heating wire 102 may be applied. In conjunction with this, the electrical heating wire 102 is first aligned with the grooves 106 and pressed in at a point of origin. Once one end of the electrical heating wire 102 is secured within the grooves 106 of the flooring underlayer 100 (see FIG. 4), the installer may continually feed the electrical heating wire 102 and press the electrical heating wire 102 material into the grooves 106 of the flooring underlayer 100 in a controlled manner. It has been found that it is quite effective to simply slide the foot mounted work accessory 10R, 610 along the groove 106, with the electrical heating wire 102 seated or otherwise positioned within the channel 60, 660 as the electrical heating wire 102 is fed from a spool above the groove 106 (see FIGS. 5, 6, 7 and 12). With proper pressure, one can force the electrical heating wire 102 within the groove 106 as the installer slides the foot mounted work accessory 10R, 610 over the electrical heating wire 102 in a desired direction so as to form a continuous line of electrical heating wire 102 within the groove 106 with limited effort and problems. Controlled installation of the electrical heating wire 102 is facilitated by providing an alignment channel 60, 660. The alignment channel 60, 660 acts to maintain the electrical heating wire 102 in the channel 60, 660 and thereby helps to control the electrical heating wire 102 as one attempts to press the electrical heating wire 102 beneath the foot mounted work accessory 10R, 610 and into the groove 106 of the flooring underlayer 100. The channel 60, 660 provides sufficient control to allow for the formation of bends in the applied wiring (which are required by the manufacturer's installation procedures for proper warrantied installation). All of this may be done while the installer remains upright as it is the foot mounted work accessory secured to the installer's foot that guides the electric heating wire 102 into the grooves 106 of the flooring underlayer 100 and not the hands of the installer.

Once the electrical heating wire 102 and flooring underlayer 100 are secured, the installer may simply remove the foot mounted work accessory from his one or two feet and clean the surfaces as needed. Thereafter, the decorative flooring surface may be applied in a known manner.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A foot mounted work accessory used in the installation of a flooring underlayer and associated electrical heating wire, comprising:
    a substantially rigid base member including an upper surface and a lower surface with sidewalls extending between the upper surface and the lower surface, the base member further includes a first end having a forward edge extending between the upper and lower surfaces and a second end having a rear edge extending between the upper and lower surfaces, first and second lateral edges extend between the upper surface and the lower surface along the left and right sides of the base member;
    an alignment channel formed at a forward tip of the foot mounted work accessory, wherein the alignment channel is a recessed groove with a curved configuration that changes in its relative angular orientation in a manner adapted to prevent wire breakage and enhance application of the electric heating wire within the flooring underlayer and wherein the alignment channel includes an upper channel segment formed at an 80°-100° angle relative to the upper surface of the base member and a lower channel segment having an angle of 100°-120° relative to the upper channel segment; and
    a foot strap secured to the upper surface of the base member.

2. The foot mounted work accessory according to claim 1, wherein the forward edge is constructed with first and second arcuate segments that meet at a central longitudinal axis of the foot mounted work accessory.

3. The foot mounted work accessory according to claim 1, wherein the foot mounted work accessory is formed in a substantially teardrop shape.

4. The foot mounted work accessory according to claim 1, where the alignment channel is provided with a curved transition between the lower channel segment and the upper channel segment so as to enhance passage of the electrical heating wire therethrough.

5. The foot mounted work accessory according to claim 1, further including an alignment channel member at the first end of the base member, the alignment channel member including the alignment channel and being pivotally secured the base member at the first end of the foot mounted work accessory for pivoting about an arc.

6. The foot mounted work accessory according to claim 5, wherein the alignment channel member includes a first semicircular end shaped and dimensioned to fit within a similar semicircular recess formed at the first end of the base member.

7. The foot mounted work accessory according to claim 5, wherein the alignment channel member also includes a second end with a forward tip having the alignment channel formed therein.

8. The foot mounted work accessory according to claim 7, wherein the alignment channel is a recessed groove.

9. The foot mounted work accessory according to claim 8, wherein the alignment channel includes a curved configuration that changes in its relative angular orientation in a manner adapted to prevent wire breakage and enhance application of the electric heating wire within the flooring underlayer.

10. The foot mounted work accessory according to claim 9, wherein the alignment channel includes an upper channel segment formed at an 80°-100° angle relative to the upper surface of the base member.

11. The foot mounted work accessory according to claim 10, wherein the alignment channel also includes a lower channel segment having an angle of 100°-120° relative to the upper channel segment.

12. The foot mounted work accessory according to claim 11, wherein the alignment channel is provided with a curved transition between the lower channel segment and the upper channel segment so as to enhance passage of the electrical heating wire therethrough.

* * * * *